US012540505B2

(12) United States Patent
Brändle

(10) Patent No.: US 12,540,505 B2
(45) Date of Patent: Feb. 3, 2026

(54) HINGE-SIDE FINGER PROTECTION DEVICE

(71) Applicant: ASSA ABLOY (Schweiz) AG, Richterswil (CH)

(72) Inventor: Andreas Brändle, Winterthur (CH)

(73) Assignee: ASSA ABLOY (Schweiz) AG, Richterswil (CH)

( * ) Notice: Subject to any disclaimer, the term of this patent is extended or adjusted under 35 U.S.C. 154(b) by 0 days.

(21) Appl. No.: 18/711,920

(22) PCT Filed: Nov. 22, 2022

(86) PCT No.: PCT/EP2022/082726
§ 371 (c)(1),
(2) Date: May 21, 2024

(87) PCT Pub. No.: WO2023/089189
PCT Pub. Date: May 25, 2023

(65) Prior Publication Data

US 2025/0020018 A1 Jan. 16, 2025

(30) Foreign Application Priority Data

Nov. 22, 2021 (EP) .................................... 21209552

(51) Int. Cl.
*E06B 7/36* (2006.01)
*E05D 11/00* (2006.01)

(52) U.S. Cl.
CPC .......... *E06B 7/367* (2013.01); *E05D 11/0054* (2013.01); *E05D 2011/0072* (2013.01); *E05Y 2800/41* (2013.01)

(58) Field of Classification Search
CPC ....... E06B 7/367; E06B 7/36; E05D 11/0054; E05D 2011/0072; E05Y 2800/41
See application file for complete search history.

(56) References Cited

U.S. PATENT DOCUMENTS 6,116,826 A * 9/2000 Benway .................. B23B 47/28 144/144.1
10,683,698 B2 * 6/2020 Dintheer ................ E06B 7/367
(Continued)

FOREIGN PATENT DOCUMENTS

DE 20200553 U1 4/2002
EP 1936083 A2 6/2008
(Continued)

OTHER PUBLICATIONS

English translation of KR document. (Year: 2004).*
English translation of EP document (Year: 2014).*

*Primary Examiner* — Joseph M Rocca
(74) *Attorney, Agent, or Firm* — The Webb Law Firm

(57) ABSTRACT

A hinge-side finger protection device for a leaf door includes a protective profile attachable to the leaf door by clamping between two door hinges or between a door hinge and a stop device. An adapter part is further present having an end face of which the position relative to the protective profile is changeable in the longitudinal direction in order to enable the protective profile to be inserted and clamped between the door hinges or between the one door hinge and the stop device. The adapter part is insertable into the protective profile. The end face of the adapter part is arranged on a side of the adapter part opposite the protective profile when the adapter part is inserted in the protective profile. The hinge-side finger protection device enables quick and easy installation on a door and can be used with a different door hinges.

17 Claims, 17 Drawing Sheets

(56) References Cited

U.S. PATENT DOCUMENTS

| | | | | |
|---|---|---|---|---|
| 11,199,047 | B1 * | 12/2021 | Chapman | E06B 7/367 |
| 2018/0274287 | A1 | 9/2018 | Dintheer et al. | |

FOREIGN PATENT DOCUMENTS

| | | | | | |
|---|---|---|---|---|---|
| EP | 1936083 | B1 * | 9/2014 | | E05D 11/00 |
| EP | 3344841 | B1 | 9/2020 | | |
| EP | 3767067 | A1 | 1/2021 | | |
| FR | 2746139 | A1 | 9/1997 | | |
| KR | 200368413 | Y1 * | 11/2004 | | E06B 7/367 |

* cited by examiner

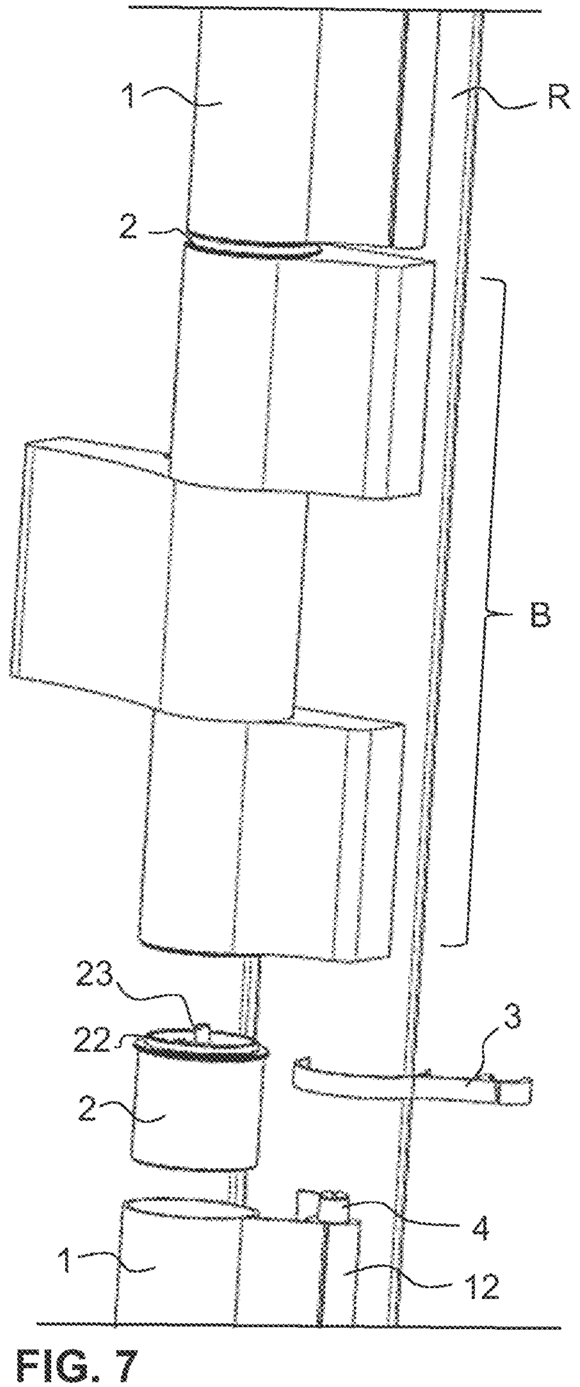
FIG. 7
FIG. 8
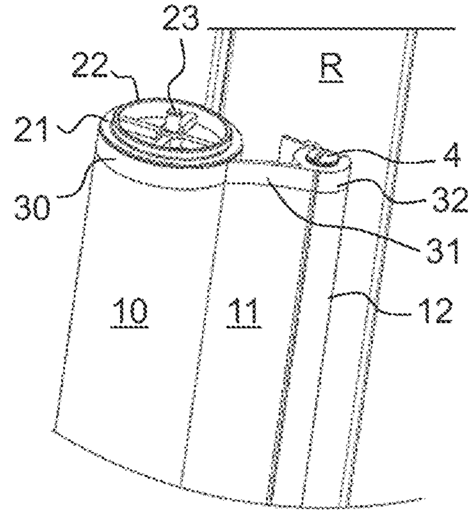

FIG. 27
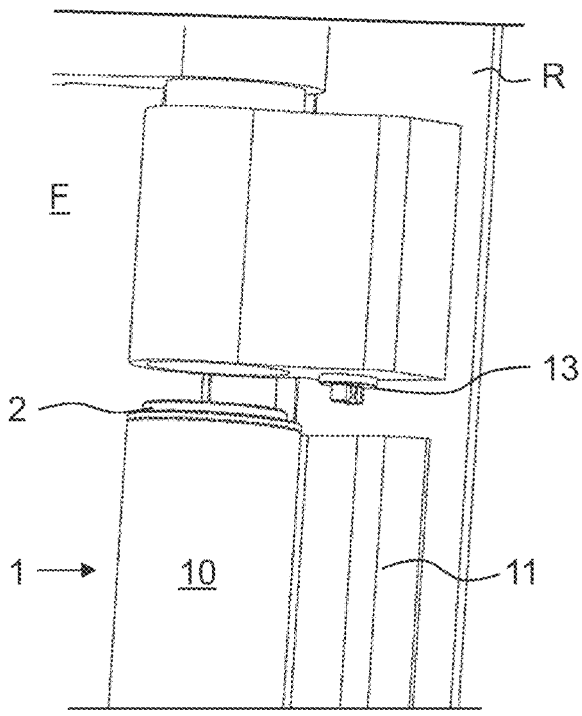
FIG. 29
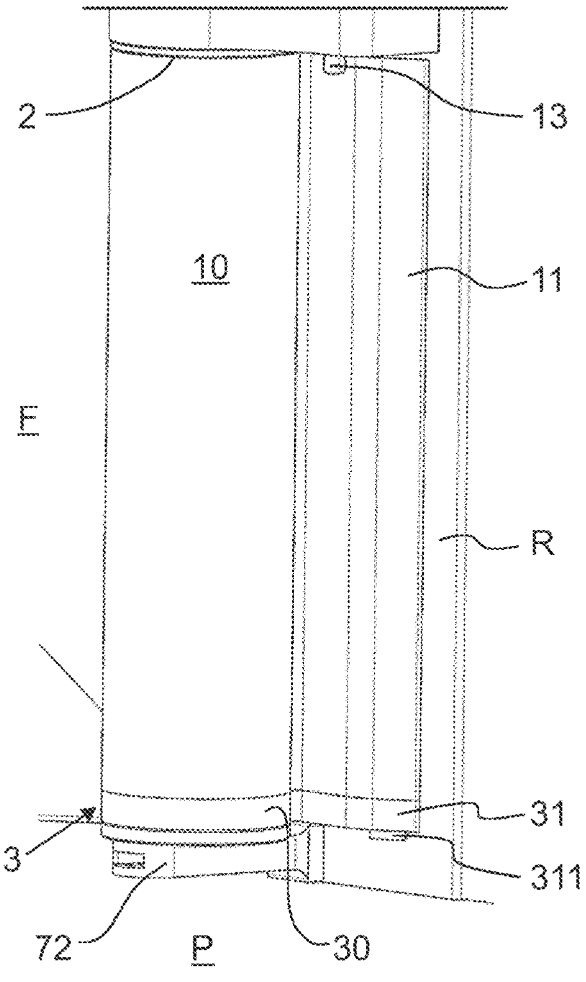
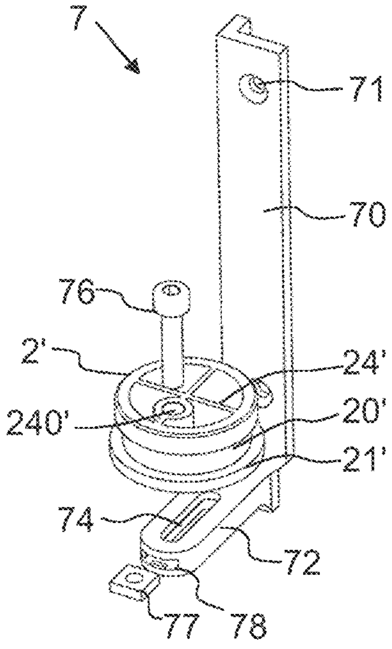
FIG. 28

FIG. 40
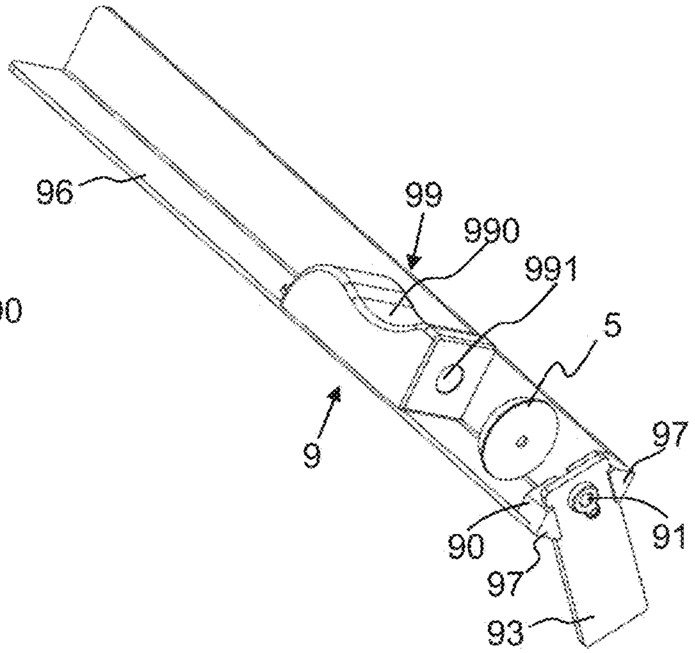
FIG. 41
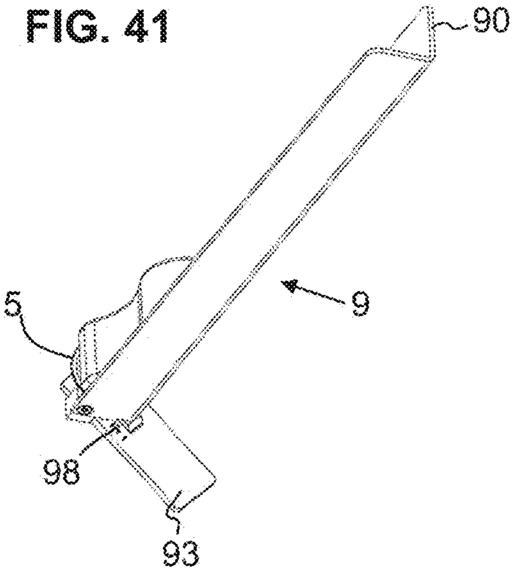
FIG. 42
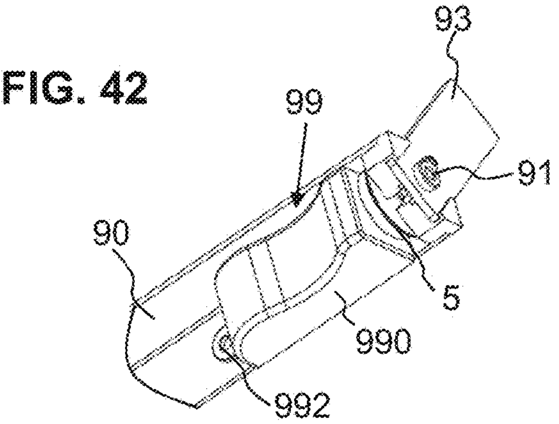
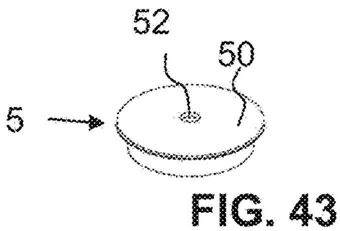
FIG. 43

HINGE-SIDE FINGER PROTECTION DEVICE

CROSS-REFERENCE TO RELATED APPLICATIONS

This application is the United States national phase of International Patent Application No. PCT/EP2022/082726 filed Nov. 22, 2022, and claims priority to European Patent Application No. 21209552.5 filed Nov. 22, 2021, the disclosures of which are hereby incorporated by reference in their entireties.

BACKGROUND OF THE INVENTION

Field of the Invention

The present invention relates to a hinge-side finger protection device for a leaf door and a mounting jig for mounting a finger protection device.

Description of Related Art

Doors carry a high risk of accidents, in particular for small children. It is a frequent occurrence for fingers to be trapped in the gap between the pivotable door leaf and the door frame. The forces acting on the trapped fingers are high, and the resulting injury is severe.

Devices are known from the prior art, therefore, which are intended to provide protection to the fingers from being inadvertently trapped. In this case, finger protection devices for the secondary closing edges of the leaf door on the hinge side and on the opposing hinge side are known.

The hinge side is that side of the pivotable door leaf on which the door hinge, i.e. the door joint, is arranged. The opposing hinge side, also called the counter hinge side, is located on the side of the door leaf opposing said door hinge. The lock side of the door leaf is located at the other end of the door, namely next to the door lock and next to the door latch.

EP 3 344 841 B1 discloses a hinge-side finger protection device for a leaf door with a substantially U-shaped protective profile, which is attached to the door frame and which extends in the vertical direction between the two door hinges of the pivotable door leaf.

EP 3 767 067 A1 shows a hinge-side finger protection device with a protective profile, which has a cylindrical base body with, arranged thereon, a protective wall which forms a tangential extension. The protective profile is attached to the door leaf, wherein to this end an attachment profile is screwed on or glued on to the door leaf. The protection wall has, at its free end, a groove which surrounds a cylindrical receptacle for the attachment profile and is fixed in its position by means of a screw.

FR 2 746 139 A1 describes a finger protective profile with a substantially U-shaped portion that is placed over the door hinge and is connected to further portions.

DE 202 00 553 U1 relates to a hinge-side anti-trap protection means that has mounting sleeves that are attached to the swivel joint of the door hinge. This is possible thanks to grooves in the mounting sleeves. A protective tube arranged between two door hinges is placed on journals of these sleeves and thus covers the gap between the two door hinges. The protective tube can also be clipped on or provided with additional clips so that it can be attached either to the journal of the mounting sleeve or directly to the swivel joint. An additional fastening means, for example an adhesive, is necessary for this.

EP 1 936 083 A1 describes a tubular support device for a door hinge, which is designed as a spring-loaded clamping element. It is used to prevent mechanical deformation of the door hinge when used with heavy door leaves. In one embodiment, a tube is surrounded by a sleeve-shaped clamping member that can be pushed back and forth in the longitudinal direction of the tube to encompass the lower part of the door hinge.

SUMMARY OF THE INVENTION

It is an object of the invention to provide an improved hinge-side finger protection device. It is a further object of the invention to optimize the mounting of a finger protection device.

The hinge-side finger protection device for a leaf door according to the invention has a protective profile for bridging a hinge-side gap between a pivotable door leaf and a door frame of the leaf door. The protective profile can be attached to the leaf door by being clamped between two door hinges or between a door hinge and a stop device. It also has an adapter part with an end face of which the position relative to the protective profile can be changed in the longitudinal direction in order to enable the protective profile to be inserted and clamped between the door hinges or between one door hinge and the stop device. According to the invention, the adapter part can be inserted into the protective profile. The end face of the adapter part, the position of which can be changed, is arranged on a side of the adapter part opposite the protective profile when the adapter part is inserted in the protective profile.

Depending on the type of application, the adapter part is inserted together with the protective profile between the door hinges or between one door hinge and the stop device. In other types of application, the adapter part is already positioned in the region of the door, e.g. on a stop device, the ceiling or the floor, and the protective profile is placed over the adapter part during insertion. The former is usually, but not exclusively, the case between the hinges. The latter is more likely, but not exclusively, between the door hinge and the stop device, ceiling or floor.

The adapter part itself or a clamping element allow the adapter part and protective profile to be clamped together on the door hinge.

Since the adapter part can be inserted into the protective profile and can be clamped together with the protective profile, the finger protection device can have a design adapted to the shape of the door hinge. In particular, the surface of the finger protection device, especially the surface of the unit of protective profile and adapter part, can be aligned with the outer contour of the door hinge.

Furthermore, the finger protection device is easy to fit. No tools are required for this.

As the finger protection device is held in place by being clamped between the door hinges, there is no need for additional attachment to the door frame or door leaf in this region. This means that no holes need to be drilled in these components.

The end face of the adapter part can be designed in such a way that the same adapter part is suitable for connection to differently shaped door hinges. In other embodiments, the finger protection device comprises a set of two or more differently shaped adapter parts which are used with the other components of the finger protection device according to the shape of the door hinges.

Another advantage is that the protective profile can be supplied by the meter and can be easily shortened to the desired length by the manufacturer of the finger protection device. Shortening on site during the mounting process is also possible in a simple manner, as it is possible to insert the adapter part into the protective profile on site. The shortening is usually done by sawing or cutting. The protective profile is preferably produced from a metal, for example aluminum, or a plastics material.

In a preferred embodiment, the protective profile has a tube into which the adapter part can be inserted. The tube can have a round cross section or a different cross-sectional shape to match the door hinges, depending on the desired design.

Depending on the embodiment, the protective profile may only consist of this tube. This is particularly the case with narrow door hinges and/or with doors that only have such a small gap between the door leaf and door frame that a simple tube is sufficient to cover the gap sufficiently. The aim is usually to ensure that there is no room for a child's finger in the remaining gap.

In other embodiments, the protective profile has a protective wall molded onto the tube and protruding from the tube. This protective wall covers the gap and ensures finger pinch protection even with large door hinges. Depending on the embodiment, the protective wall can protrude tangentially from the tube or at a different angle.

To ensure that the protective wall remains in position, it is preferably fixed to the door frame or door leaf. For example, it can be glued or screwed on directly. Preferably, however, it has a first securing element on its free longitudinal side, which can be connected to a securing profile of the finger protection device. Preferably, the securing element can be detachably fixed. The securing profile is attached to the door, i.e., to the door frame or the door leaf. The securing profile can extend over the entire length of the protective profile or the protective wall. In other embodiments, it is only present in one portion or in several portions of the total length of the protective profile or the protective wall. The securing profile can be glued, screwed, clipped or otherwise attached to the door.

In a preferred embodiment, the securing means detachably connects the leaf door to the protective wall of the protective profile. It preferably can be plugged onto the protective wall and can be glued to the leaf door. As a result, it can be guided together with the protective profile towards the door hinge when attached and thus easily brought into the correct position. However, if the protective profile is detached later, it remains adhered to the leaf door. The connection can therefore be re-established at any time.

In one embodiment, the adapter part has a base body and an adjusting body, wherein the adjusting body is connected to the base body resiliently and can be changed in its position relative to the base body. Preferably, a child safety lock is provided so that the adjusting body cannot be moved towards the base body in an unauthorized manner in order to remove the finger protection device from the door.

In a preferred embodiment, the finger protection device has a fixing unit to fix the position of the adapter part in the protective profile and/or a connection between the adapter part and the door hinge or the stop device or a floor or a ceiling.

Preferably, the fixing unit has a clamping element that fixes the adapter part in its position relative to the protective profile. Preferably, the same clamping element is also used to fix the connection between the adapter part and the door hinge or stop device. In the case of the resilient adjustment body, the spring is the fixing unit for fixing the adapter part to the door hinge or stop device.

If a protective wall and a securing profile are present, the fixing unit preferably has a second securing element that can be connected to the securing profile. The second securing element is preferably designed in such a way that it cannot be released by a child in an unauthorized manner. Preferably, a hand tool is required to release the connection. Alternatively, it is designed so that it can be released without tools, but has a child safety lock or cannot be released by a small child.

In preferred embodiments, the adapter part has a coupling means for connection to the door hinge or to the stop device. This makes it easier to center the protective profile and enables optimum mounting.

Preferably, the coupling means is a pin projecting from the end face of the adapter part and/or a ring or ring portion projecting from the end face of the adapter part and/or a recess provided in the end face. These elements can be manufactured in a simple manner and therefore cost-effectively, and they facilitate the mounting process. Depending on the embodiment, the pin is firmly connected to the adapter part, for example in one piece, or it can be inserted into the adapter part.

So that the adapter part and the protective profile can be held with one hand and the adapter part does not slip completely into the protective profile, the adapter part preferably has a stop means that rests on an end-face edge of the protective profile. The stop means is, for example, a flange projecting radially from the adapter part. The flange is, for example, partially or completely circumferential or consists of radially protruding fingers.

The adapter part is preferably in the form of a bearing journal or a centering journal or a centering bush.

The finger protection device can be used in even more versatile ways if the finger protection device also has a cover for mounting on or in the door hinge or the stop device and if this cover can be connected to the adapter part. In cases where the end faces of the door hinges are shaped in such a way that a direct connection between the adapter part and the door hinges is not possible, a cover can be attached to the end face of the door hinge. Depending on the embodiment, the cover is part of the finger protection device S or an existing cover of the door hinge B.

Preferably, the finger protection device comprises the stop device. This preferably has an attachment limb and an adjusting member, wherein the position of the adjusting member can be changed transversely to the longitudinal direction of the protective profile relative to the attachment limb. This allows the stop device to be attached to the door and subsequently adapted to the door hinge. The finger protection device can thus be easily mounted in a uniform alignment over the entire length of the door.

In a further embodiment, the stop device is an angle element, wherein the attachment limb forms a first limb of the angle element and a second limb of the angle element is provided with a slot, and wherein the adapter part has a decentrally arranged through-opening for attaching the adapter part to the second limb in a selectable position along the slot. This stop device can be made relatively small. However, thanks to the off-center attachment, the desired position can be set by rotating the adapter part even without a pivotable limb.

To facilitate the mounting process, a mounting jig is preferably available, which can be sold as a set with the finger protection device or separately. The mounting jig is particularly helpful if a cover or a surface of another component has to be provided with a hole into which a pin of the adapter part is to engage during the mounting process.

Preferably, the mounting jig has a base plate which has a stop surface projecting downwards from the base plate for receiving a component, for example the cover. Furthermore, the base plate has a through-opening located between the stop surfaces and a groove arranged on the side of the base plate opposite the stop surfaces to accommodate a slider. The mounting jig also includes the slider, which has a marking with information relating to the component and a drilled hole. The through-opening is larger than the drilled hole, whereby the drilled hole provides access to the through-opening in different sliding positions of the slider to allow drilling through the drilled hole and the through-opening.

Preferably, the base plate also has a locking means for locking the slider inserted into the groove.

Preferably, the two stop surfaces are arranged at right angles to each other. The groove preferably extends at a 45° angle to the stop surfaces so that the slider moves along a bisector of the angle formed by the two stop surfaces.

This mounting aid can also be used for other components or for other finger protection devices.

In another embodiment, the mounting jig according to the invention has a base plate and a slider held displaceably in the base plate. The slider has a holding means for holding a first component on a side of the slider opposite the base plate. An angle profile with two stop surfaces at an angle to each other is arranged on the base plate. The slider has a marking for setting a hinge diameter so that the first component can be positioned at a suitable point in relation to the door hinge when the stop surfaces are in contact with a door hinge with the set hinge diameter.

This mounting jig is suitable for placing the adapter part of the finger protection device according to the invention on the floor, on the ceiling or at another fixed location in the region of the door hinges.

In preferred embodiments, the two above-mentioned functions of the mounting jigs are combined in a common device. This facilitates handling and reduces the risk that one of the two mounting jigs is not at hand.

In a preferred embodiment, the mounting jig described above with the angle profile has stop surfaces that protrude from the base plate and serve as stop surfaces for a second component, preferably for the cover of the finger protection device. The second component can thus be placed on the base plate on the side of the base plate opposite the slider. The base plate has a through-opening. The slider can be adjusted relative to the base plate using the marking and the reference according to the diameter of the second component. The slider has a drilled hole, wherein the through-opening is larger than the drilled hole, wherein the drilled hole allows access to the through-opening in different sliding positions of the slider.

Preferably, in these embodiments, the base plate also has a locking means for locking the slider inserted into the groove.

BRIEF DESCRIPTION OF THE DRAWINGS

The terms FIG., FIGS., FIGURE, and FIGURES are Used Interchangeably in the Specification to Refer to the corresponding figures in the drawings.

Preferred embodiments of the invention are described in the following with reference to the drawings, which merely serve for elucidatory purposes and are not to be understood as limiting. In the drawings.

FIG. 7 shows an exploded view of a second installation variant of the finger protection device with the protective profile according to FIG. 2;

FIG. 8 shows the installation variant according to FIG. 7 in the mounted state, but without a view of the door hinge;

FIG. 27 shows the finger protection device according to FIG. 25 when removing the protective profile;

FIG. 28 shows a perspective view of a stop device in a second embodiment;

FIG. 29 shows the finger protection device with the stop device according to FIG. 28 in the mounted state;

FIG. 40 shows a further perspective exploded view of the mounting jig according to FIG. 33 with a drilling aid;

FIG. 41 shows a further perspective view of the mounting jig with the drilling aid according to FIG. 40;

FIG. 42 shows a perspective view of a part of the mounting jig with the drilling aid according to FIG. 40; and FIG. 43 shows a perspective view of a cover drilled with the mounting aid.

Like parts are provided with like reference signs.

DESCRIPTION OF THE INVENTION

Figure 1:
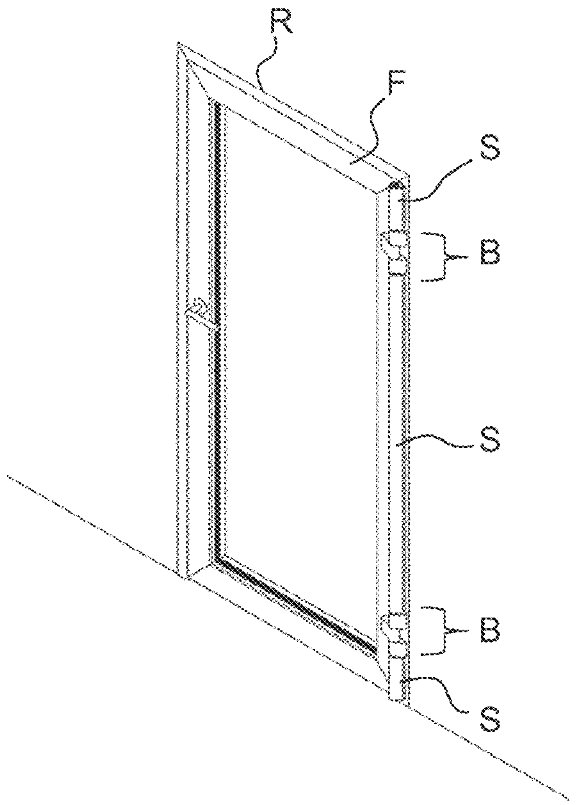
FIG. 1 shows a perspective view of a door with a hinge-side finger protection device according to the invention.

FIG. 1 shows a leaf door with a door frame R, also called a door case, and a door leaf F. The door leaf F is held pivotably on the door frame R by means of door hinges B. A hinge-side finger protection device S according to the invention is arranged between the two door hinges B as well as above the uppermost door hinge B and below the lowermost door hinge B.

A door usually has two or three door hinges B arranged at a distance from each other. They can be of different shapes. The illustration in FIG. 1 is merely exemplary. The finger protection device S according to the invention can be used not only with three-part door hinges as shown here, but also with two-part door hinges or with other types of door hinges.

When the door is opened, a gap is created on the hinge side between the door frame and the door leaf, in which fingers, especially those of children, may become trapped when the door is closed again. It is therefore advantageous to fit the finger protection devices S on the hinge side at least over the height of the door that can be reached by small children, preferably over the entire height. As can be seen in FIG. 1, a first finger protection device S is fitted between the hinges B and a second and third finger protection device S is fitted above and below. They cover the resulting gap in such a way that no finger can be inserted into the gap.

Figure 2:
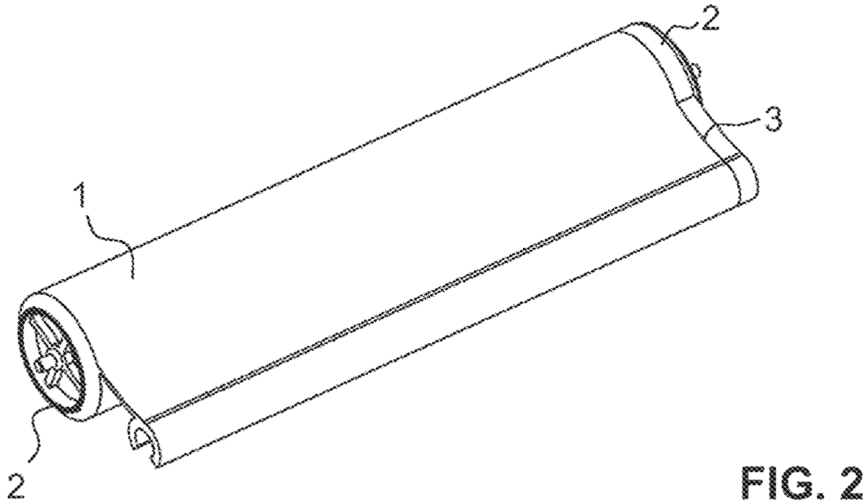
FIG. 2 shows a perspective view of a protective profile with adapter parts inserted on both sides according to a first embodiment of the invention.
Figure 3:
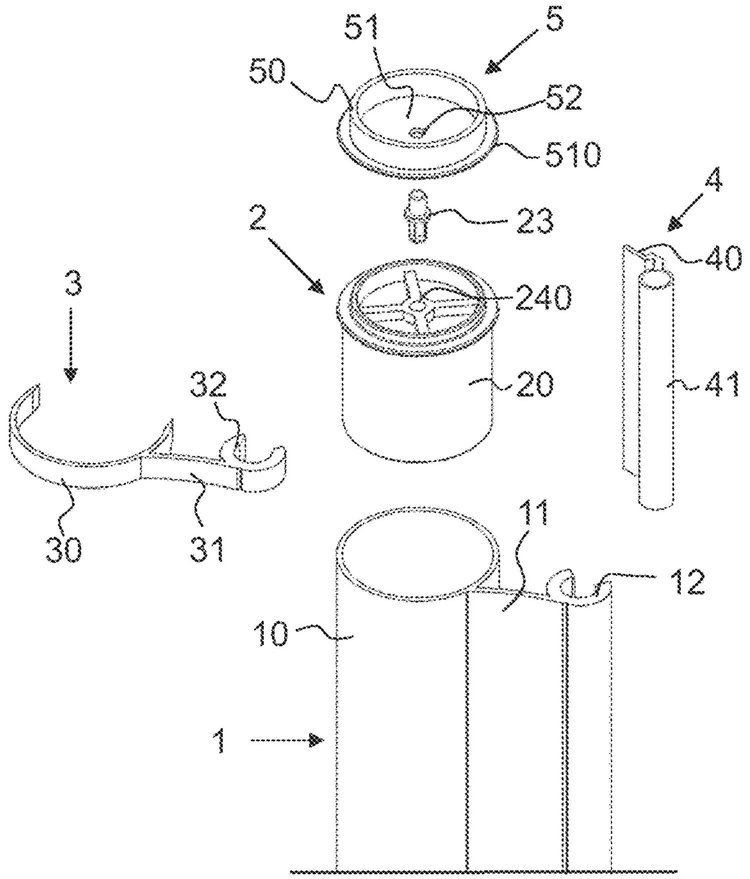
FIG. 3 shows an exploded view of components of the finger protection device according to the invention with the protective profile according to FIG. 2.
Figure 4:
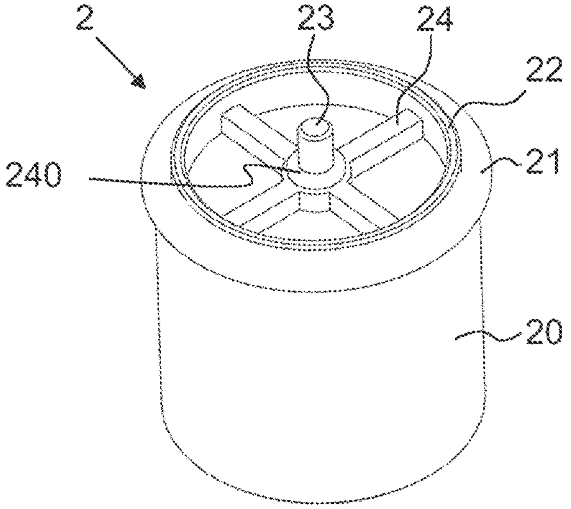
FIG. 4 shows a perspective view of the adapter part according to FIG. 2.

FIGS. 2 to 4 show a first embodiment of the finger protection device S according to the invention. It has a protective profile 1, which is preferably produced from a metal, in particular aluminum, or a plastics material. Preferably, it is made in one piece. It also comprises at least one adapter part 2, preferably two adapter parts 2. There is also a fixing unit, in this case in the form of a clamping element 3. The finger protection device S also comprises a securing profile 4 and preferably a cover 5.

The protective profile 1 has a tube 10, the outer shape of which is preferably adapted to the shape of the door hinge B. In this example, it has a round cross section. Preferably, a protective wall 11 is formed on the tube 10 and preferably extends over the entire length of the tube 10. It protrudes laterally from the tube 10. The free longitudinal side of the protective wall 11 merges into a first securing groove 12.

The adapter part 2 has a base body 20 with an outer shape that allows the base body 20 to be inserted into the tube 10. In this example, the shape is a cylinder. In this example, the base body 20 is hollow, wherein it is provided at one end with struts 24, which lead to a central receiving opening 240. A pin 23 can be inserted into this receiving opening 240 and removed again. In other embodiments, a pin 23 is non-detachably connected to the base body 20 or is integrally formed thereon.

At one end of the base body 20, in this example at the end with the struts 24, a radially projecting flange 21 and a ring 22 projecting upwards in the longitudinal direction of the base body 20 are formed. The adapter part 2 is preferably produced from a metal or a plastics material.

The adapter part 2 and tube 10 are preferably dimensioned in such a way that the adapter part 2 is held in the tube 10 slightly clampingly.

The clamping element 3 has a clip 30. The clip 30 is preferably resilient. In this example, it is substantially formed as part of a ring, the inner diameter of which permits a clamping connection to the circumference of the base body 20 of the adapter 2 and the outer diameter of which results in an aligned continuation of the outer surface of the tube 10.

A limb 31 projecting from the circumference is formed on the clip 30 and merges into a second securing groove 32 at its free end. The second securing groove 32 preferably has the same cross section in shape and size as the first securing groove 12. The clamping element 3 is preferably formed in one piece.

The securing profile 4 can be attached to the door. To do this, it is either glued on, screwed on, or attached in some other way. It has a base plate 40 for this purpose. A securing body 41 is formed on the base plate 40 and forms the counterpart to the first and second securing groove 12, 32 and is accommodated therein. Alternatively, the securing body 41 can also be arranged on the clamping element 3 and the protective profile 1 and the groove on the securing profile 4. The grooves and the securing body are thus securing elements that can be brought into engagement with each other.

The cover 5 preferably has an annular base body 50, which is closed at one end with a flat base 51, wherein the base 51 forms a flange 510 projecting from the ring 50. The ring 50 can have different cross sections to match the outer contour of the lower or upper end face of the door hinge B. In this example, it is circular. There is a receiving opening 52 in the center of the base 51. This receiving opening is usually only made on site before installation, so the base 51 can also be designed without openings. Depending on the embodiment, the cover 5 is part of the finger protection device S or an existing cover of the door hinge B.

Figure 5:
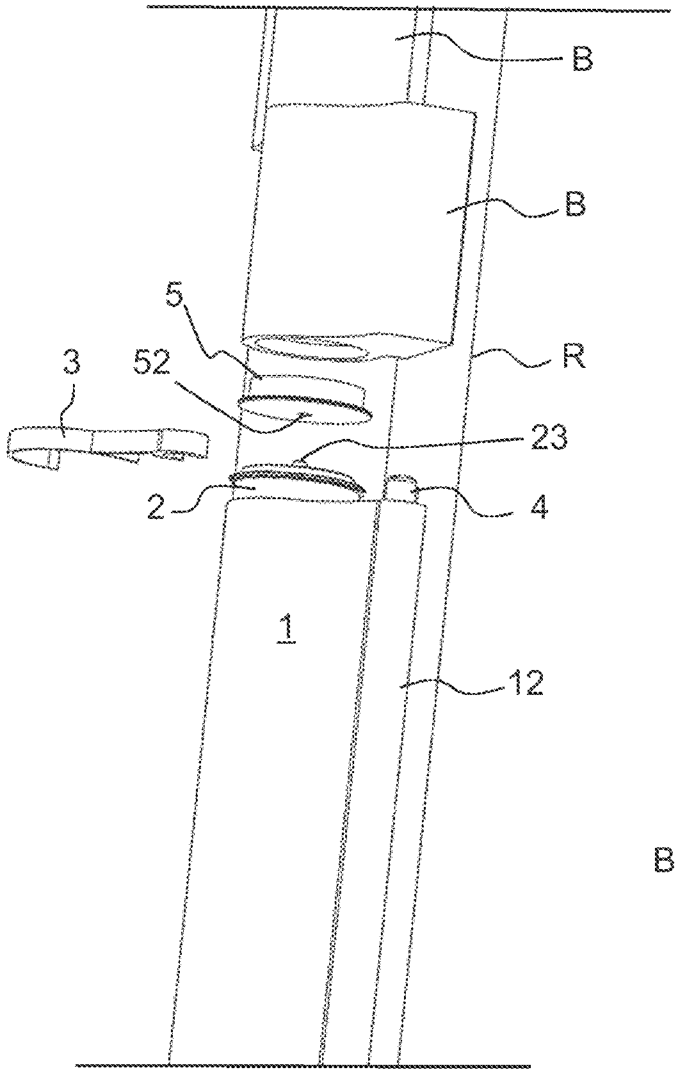
FIG. 5 shows an exploded view of a first installation variant of the finger protection device with the protective profile according to FIG. 2.
Figure 6:
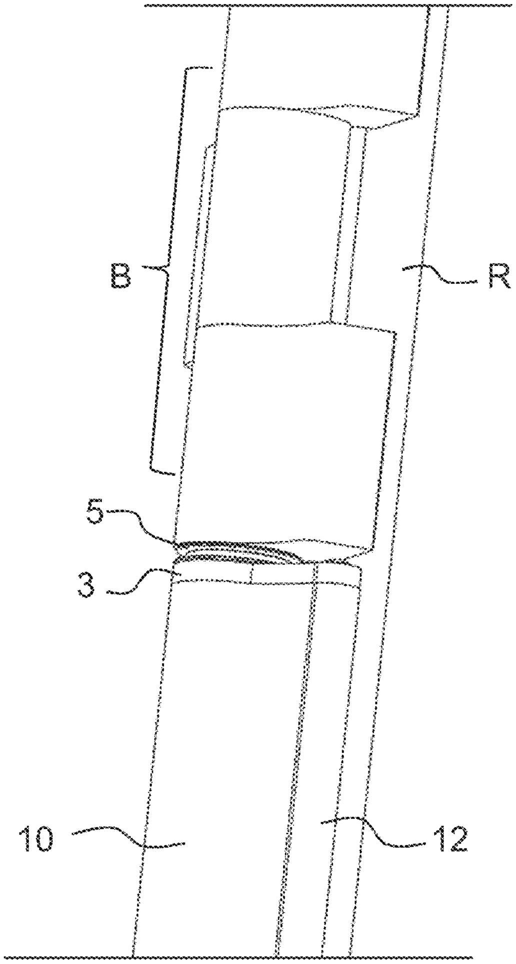
FIG. 6 shows the installation variant according to FIG. 5 in the mounted state.

FIGS. 5 and 6 show a first mounting option for the finger protection device S according to the invention. The securing profile 4 is attached to the door frame R or to the door leaf F. In FIG. 5, there is a large gap between the securing profile 4 and the door hinge B. This is not the case in practice. The securing profile 4 is usually attached close to the door hinge B. However, the exploded view chosen for FIG. 5 makes it easier to recognize the individual components.

The protective profile 1 is selected in a length that is slightly shorter than the distance between the two hinges B of the door. An adapter part 2 with pin 23 is now inserted on both sides until the flange 21 rests on the end face of the tube 1. Each cover 5 is provided with a receiving opening 52, if not already present. A first cover 5 is inserted into an opening of the lower hinge B not shown in FIGS. 5 and 6, a second cover 5 is inserted into the opening of the upper hinge B visible in FIG. 5. The protective profile 1 is plugged onto the first cover 5, wherein the pin 23 engages in the receiving opening 52. The first securing groove 12 of the protective profile 1 is plugged onto the securing profile 4 before or after this. Now the upper adapter part 2 is pushed partially upwards out of the protective profile 1 until its pin 23 engages in the receiving opening 52 of the upper cover 5. For fixing, the clip 30 of the clamping element 3 is inserted between the flange 21 of the adapter 2 and the end face of the tube 1. The second securing groove 32 of the clamping element 3 is also plugged onto the securing body 41 of the securing profile 4. This results in an arrangement that is approximately aligned with the shape of the door hinges B, as can be seen in FIG. 6.

The protective profile 1 is clamped between the two hinges B thanks to the adapter 2 and the clamping element 3. The clamping element 3 fixes the adapter part 2 in its position relative to the tube 10 and also fixes the adapter part 2 and the protective profile 1 in their position between the two hinges B. The connection of the protective profile 1 to the securing profile 4 only serves to ensure that the protective wall 11 of the protective profile 1 is arranged at the desired angle to the door and cannot be pivoted away and thus cannot open the gap. The clamping element 3 cannot be easily removed again thanks to the clip 30 and also thanks to the second securing groove 32. This usually requires a hand tool or sufficient strength in the fingers. This means that the protective device cannot be removed by a child.

Instead of placing the protective profile 1 with the lower adapter part 2 on the lower hinge B, it can also be held on the upper door hinge B. The lower adapter part 2 is pulled out and the clamping element 3 is attached to the lower end of the protective profile 1. The procedure and the effect are the same.

FIGS. 7 and 8 show a second variant of use. In this example, the door hinges B have suitable receiving openings for the pin 23. Alternatively or additionally, the outer diameter of the ring 22 corresponds approximately to the inner diameter of the opening on the end face of the door hinge B. The adapter part 2 can thus be connected to the door hinge B without using a cover 5. If the ring 22 is sufficient for centering the adapter part 2 in the door hinge B, the pin 23 can be dispensed with. It is advantageous if the pin 23 is removably arranged in the adapter part 2, as there is no corresponding space in the door hinge depending on the design of the door hinge.

In the upper region of FIG. 7, the connection has already been created. In the lower part of FIG. 7, the arrangement is shown in an exploded view similar to FIG. 5, wherein the distance between protective profile 1 and securing profile 4 is shown on an exaggerated scale.

Figure 9:
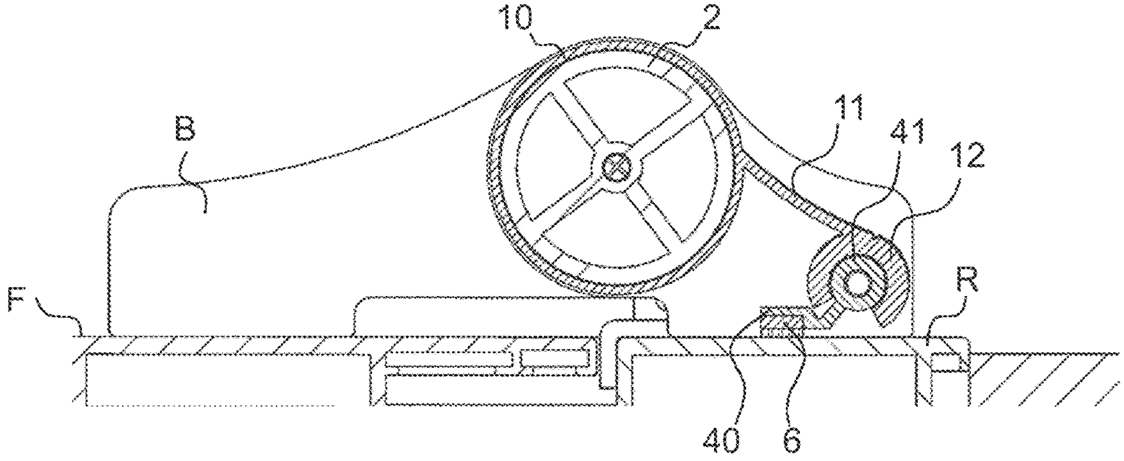
FIG. 9 shows a cross section through the installation variant according to FIG. 7.

FIG. 9 shows a cross section through the connection according to FIGS. 5 to 8. In this example, the base plate 40 of the securing profile 4 is glued to the door frame R or to the door leaf F by means of an adhesive strip 6.

Figure 10:
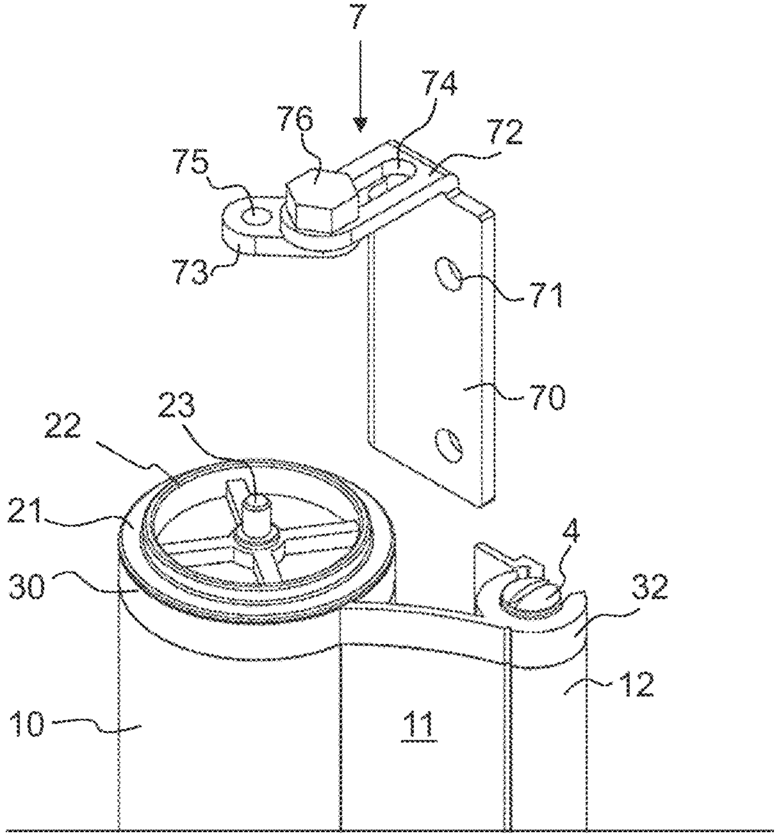
FIG. 10 shows a perspective view of the protective profile according to FIG. 2 with a stop device.
Figure 11:
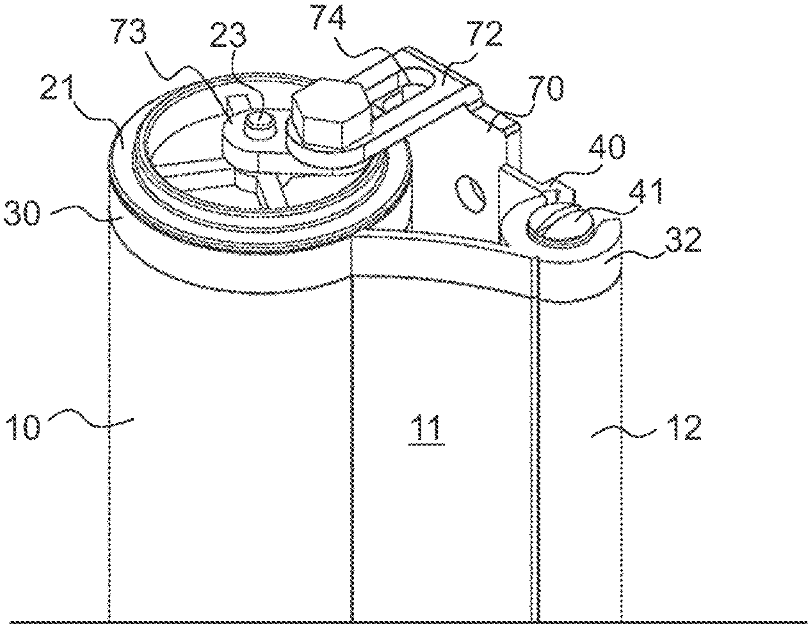
FIG. 11 shows the protective profile with stop device according to FIG. 10 in the mounted state.
Figure 12:
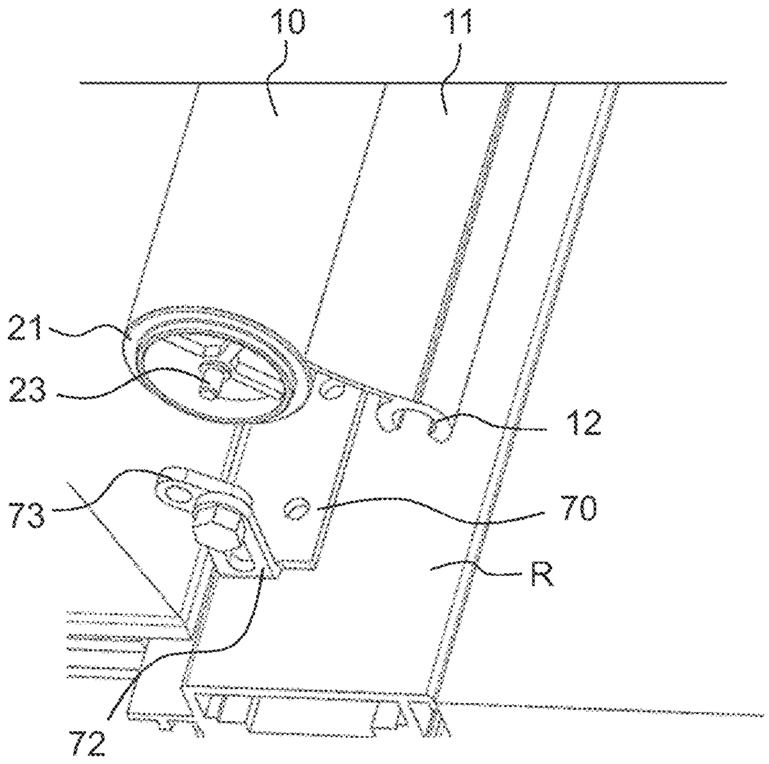
FIG. 12 shows the protective profile with stop device according to FIG. 10 during the process of mounting on a door.

FIGS. 10 to 12 show how the finger protection device S can be attached above the uppermost door hinge B and below the lowermost door hinge B. A stop device 7 is provided for this purpose. It serves as a replacement for the missing second door hinge B. It has a first limb 70 with attachment holes 71 for attachment to the door, in this case to the door frame R. As an alternative to screwing on, the limb 70 can also be glued on, for example.

A second limb 72 extends at a right angle from the first limb 70. The second limb 72 has a slot 74. An adjusting member 73 is held on the second limb 72 and is displaceable relative to the second limb 72 along the slot 74 and can also be pivoted relative to the second limb 72. It can be fixed in the respective position by means of a fixing element 76, in this case a nut. The adjusting member 73 has a pin receptacle 75 for receiving the pin 23 of the adapter 2.

As can be seen in FIG. 12, the protective profile 1 and the adapter part 2 can in turn be placed on the stop device 7 with the pin 23 in order to then pull out the other adapter part 2 at the other end of the protective profile 1 and fix it in place with the clamping element 3. The securing profile 4 is not shown here, but is preferably also present. As in the examples above, the assembly sequence can also be reversed here. This means that the protective profile 1 is placed on the door hinge B and the adapter part 2 is pulled out on the side of the stop device 7 and secured with the clamping element 3.

The procedure on the upper and lower side of the door is the same. The above description applies analogously to both arrangements.

Preferably, the same adapter part 2 is always used on both sides of the protective profile 1, wherein it is used with or without a pin 23 on the door hinge side, depending on the design of the door hinge. However, it is also possible to use differently shaped adapter parts 2.

Figure 13:
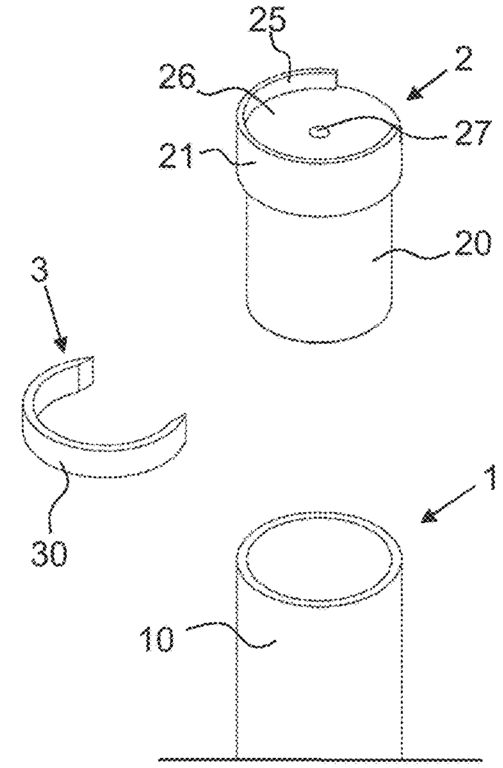
FIG. 13 shows an exploded view of components of the finger protection device according to the invention in a further embodiment.
Figure 14:
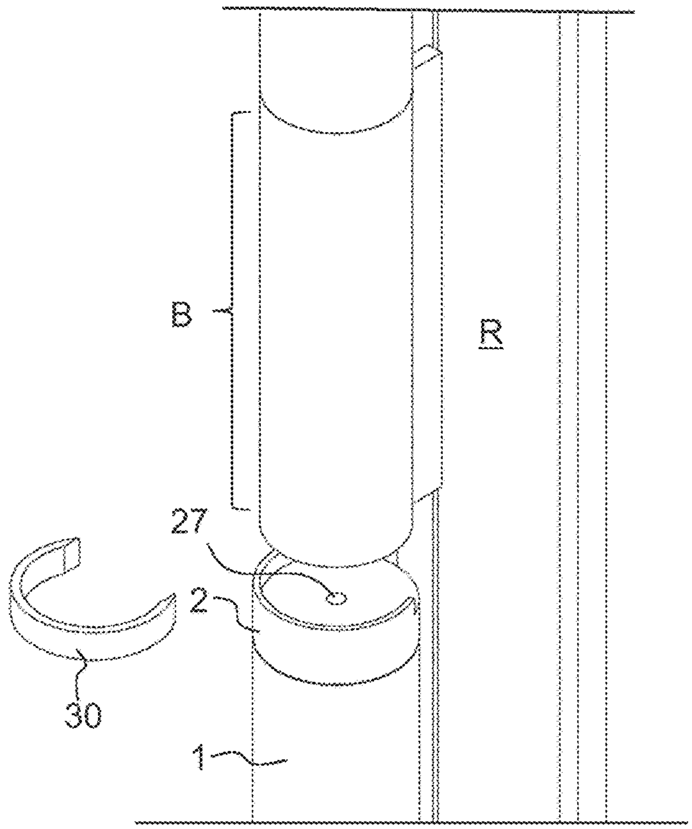
FIG. 14 shows a perspective view of the finger protection device according to FIG. 13 in a first mounting step.
Figure 15:
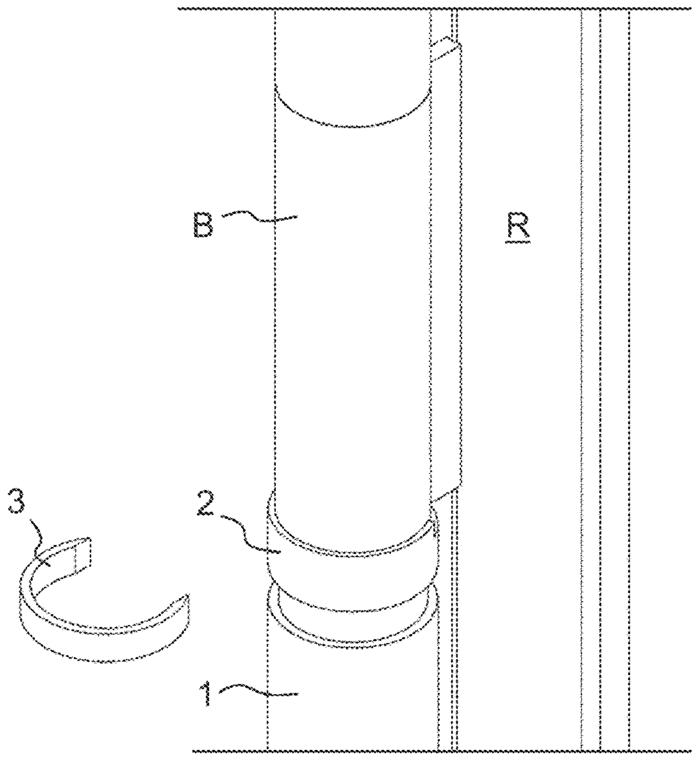
FIG. 15 shows the finger protection device according to FIG. 13 in a second mounting step.
Figure 16:
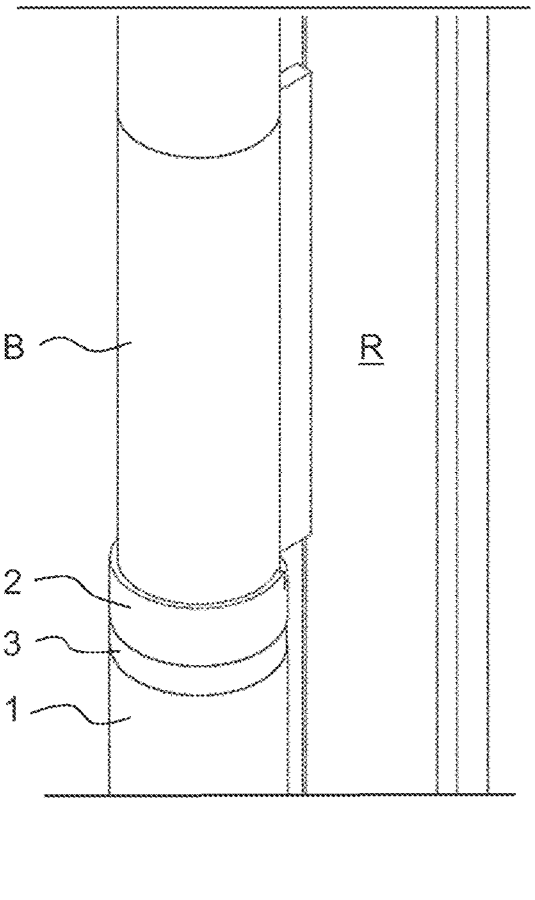
FIG. 16 shows the finger protection device according to FIG. 13 in the mounted state.

FIG. 13 shows a further embodiment of the finger protection device S according to the invention. FIGS. 14 to 16 show an installation variant of this embodiment, wherein the distance between the protective profile 1 and the door hinge B during the mounting process is shown correctly in these figures.

In this example, the protective profile 1 consists of a simple tube, preferably with a round cross section. There is no further protective wall. The adapter part 2 is cylindrical in shape and fits back into the tube 10. It again has a flange 21 to rest on the upper end face of the tube 10.

The adapter part 2 can be designed identically to that already described with reference to FIGS. 2 to 12. In this example, however, it has an upwardly projecting ring 25 arranged on the outer circumference. The ring 25 can be closed or open. Its inner diameter substantially corresponds to the outer diameter of the door hinge B, so that it encloses the door hinge B during the mounting process. In this embodiment, the adapter part can also have the struts and the pin and/or the central opening. In this example, however, it has a closed base 26 in which a centering hole 27 is arranged.

The clamping element 3 consists only of the clip 30, which is substantially formed as part of a ring 30.

Mounting is carried out in the same way as in the previous examples. The adapter parts 2 are pushed into the tube 1 on both sides. One of the adapter parts 2 is pulled out so far that its ring 25 passes over the adjacent door hinge B. The clamping element 3 is clamped between the flange 21 and the end face of the tube 10. This fixes the adapter part 2 and the tube 1. This arrangement is particularly suitable for narrow hinges where the door gap is relatively small and no further protective wall is required.

The adapter part 2 shown here can also be combined with the protective profile 1 according to FIGS. 2 to 12.

Figure 17:
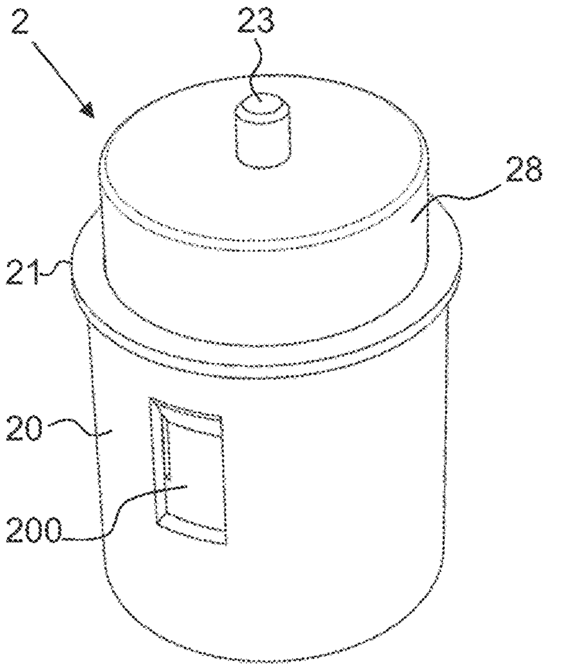
FIG. 17 shows a perspective view of the adapter part in a further embodiment according to the invention.
Figure 18:
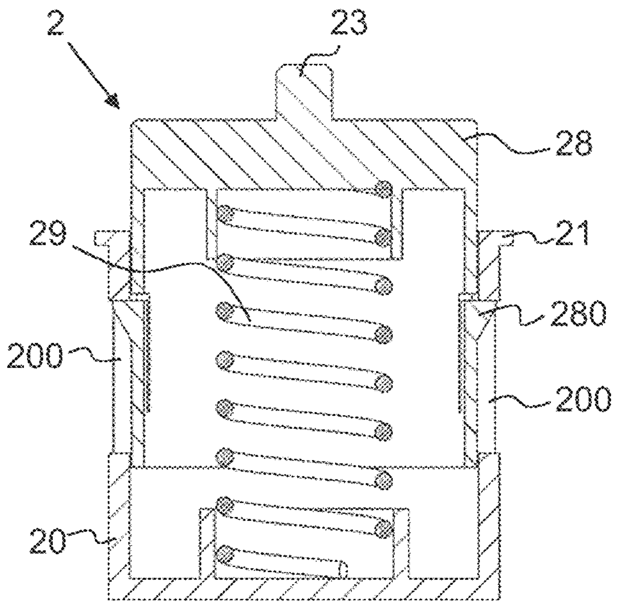
FIG. 18 shows a cross section through the adapter part according to FIG. 17.
Figure 19:
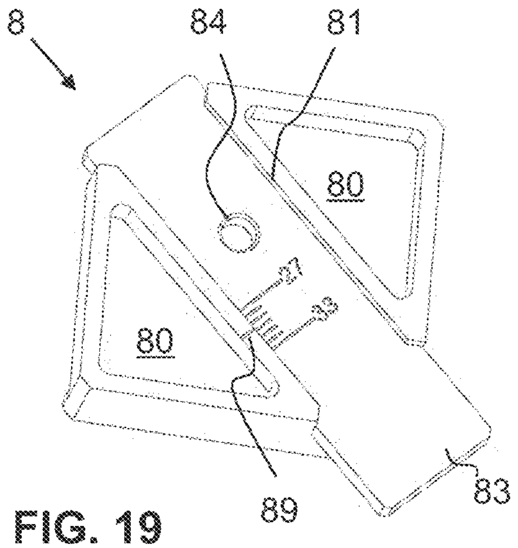
FIG. 19 shows a perspective view of a mounting jig according to the invention from above.
Figure 20:
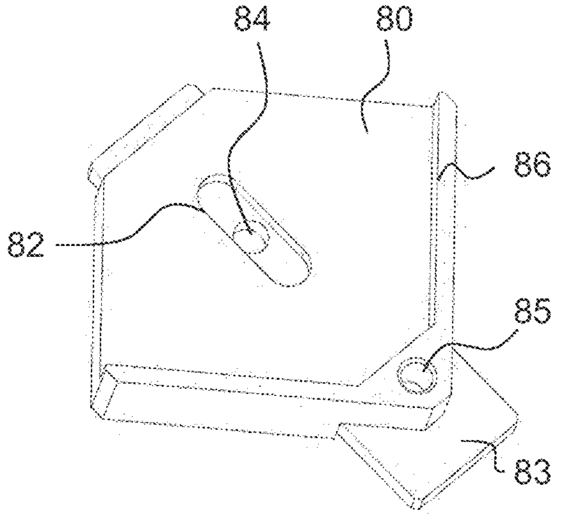
FIG. 20 shows a perspective view of the mounting jig according to FIG. 19 from below.
Figure 21:
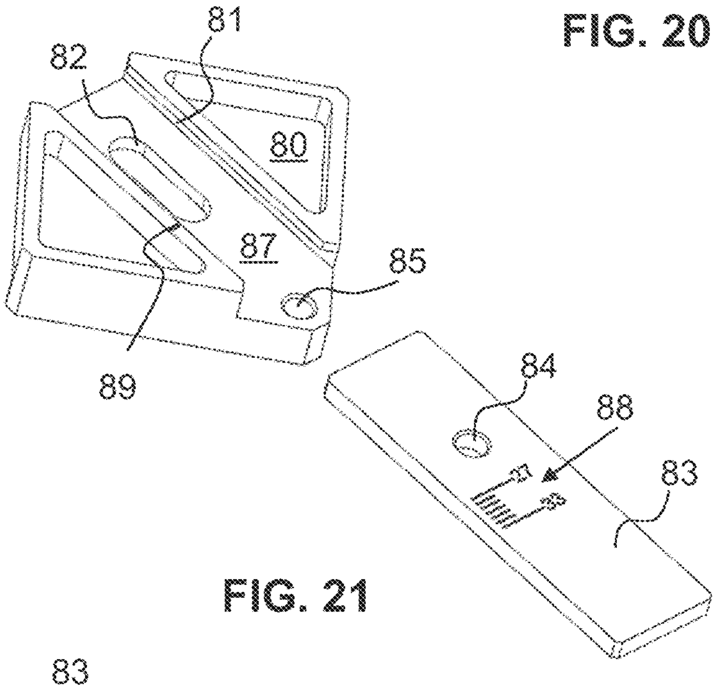
FIG. 21 shows a perspective view of the mounting jig according to FIG. 19 with the slider pulled out.
Figure 22:
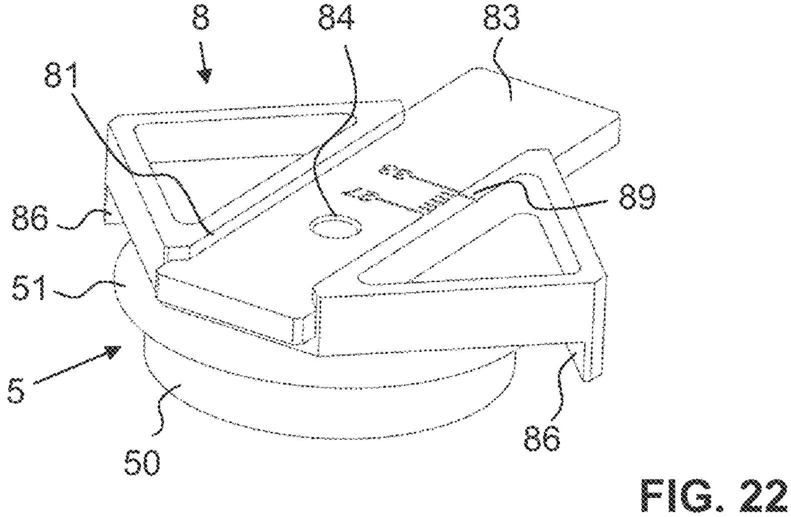
FIG. 22 shows a perspective view of the mounting jig in use with a cover.

FIGS. 17 and 18 show a further variant of an adapter part 2, which can also be combined with the protective profile 1 according to the previous examples, in particular with the protective profiles according to FIGS. 2 to 16.

The adapter part 2 again has a cylindrical base body 20 with a flange 21 to rest on the end face of the tube 10. An adjustment body, in this case a displacement body 28, is slidably arranged in the base body 20. The displacement body 28 is also preferably cylindrical in shape. In this example, the free surface of the displacement body 28 is closed with a central pin 23 for connection to the door hinge B. However, this surface can also be formed as in the previous examples. For example, struts 24 and/or a removable pin 23 may be present. Furthermore, a ring 25, a radially inwardly offset ring 22 or a receiving opening 240 may be present on the circumference.

The two bodies 20, 28 form a bearing bush, inside which a spring 29 is arranged. During the mounting process, the displacement body 28 is pressed inwards against the spring force until the protective profile 1 is in the desired position. It is then released so that the displacement body 28 is pressed against the door hinge or the stop device thanks to the spring force.

To remove the finger protection device S, at least one window 200 is provided in the base body 20, through which a slider 280 of the displacement body 28 protrudes. This slider 280 can be pushed downwards in order to release the displacement body 28 from its engagement with the door hinge B. Preferably, this is realized in a childproof manner, for example by requiring the use of a tool.

It is sufficient to use such an adapter part 2 on only one side of the protective profile 1. An adapter part 2 in accordance with the previous exemplary embodiments can be used on the other side. There is no need to use a clamping element 3.

FIGS. 19 to 22 show a mounting jig 8, by means of which the cover 5 can be provided with the receiving opening 52. The mounting jig 8 is particularly suitable for the covers 5 described above, but it is also suitable for other applications and for other components.

It has a base plate 80, which is preferably square in shape. There is a downwardly projecting edge on two limbs at an angle to each other, which forms two straight stop surfaces 86. The stop surfaces 86 are preferably at right angles to one another. Other angles or other shapes of the stop surfaces 86 are also possible. On the opposite upper side of the base plate 80, a groove 87 is formed between two side guides 81 running parallel to each other. A slot 82 is provided at the bottom of the groove 87 and extends in the longitudinal direction of the groove 87. There is also a fixing hole 85. The slider 83 can be fixed in its position relative to the base plate 80 by means of a grub screw (not shown).

A slider 83 is arranged in the groove 87 so that said slider can be moved in the longitudinal direction. The slider 83 has first markings 88. There is a second marking 89 on the base plate 80 in the region of the side guides 81. The slider 23 also has a drilled hole 84.

As can be clearly seen in FIGS. 19 to 22, the mounting jig 7 can be placed on the cover 5 or on another component, wherein its stop surfaces 86 rest against the circumference of the cover 5. The slider 23 is pushed into the groove 87 until the desired position of the first marking 88 coincides with the second marking 89. In the case of the cover, for example, the marking indicates its diameter. However, other types of markings are also possible.

Once the desired diameter has been reached, the drilled hole 84 is located exactly at the desired position above the cover 5—in the example shown, exactly in the center. Together with the slot 82 below it, the drilled hole 84 forms direct access to the cover 5. This central point can now be marked, the mounting jig 7 removed, and the desired hole drilled in the cover 6. Alternatively, the slider can also be fixed in position using a screw located in the fixing hole and the hole drilled in the cover without removing the mounting jig 7. This mounting jig facilitates the mounting of the finger protection device according to the invention on the door.

Figure 23:
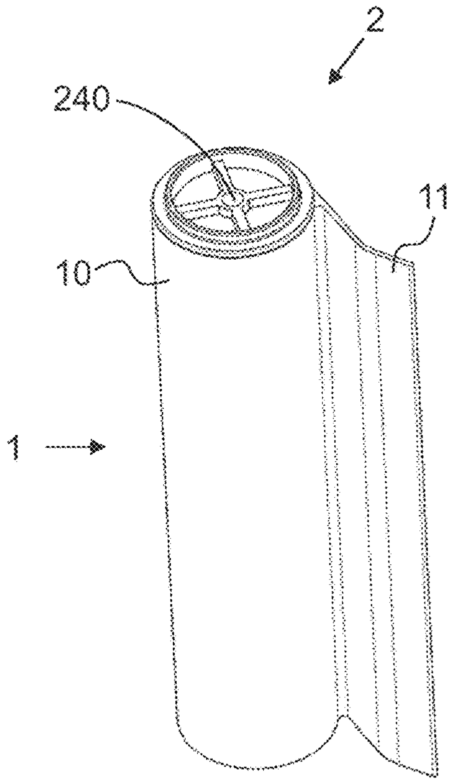
FIG. 23 shows a perspective view of a protective profile with inserted adapter part according to a further embodiment of the invention.
Figure 24:
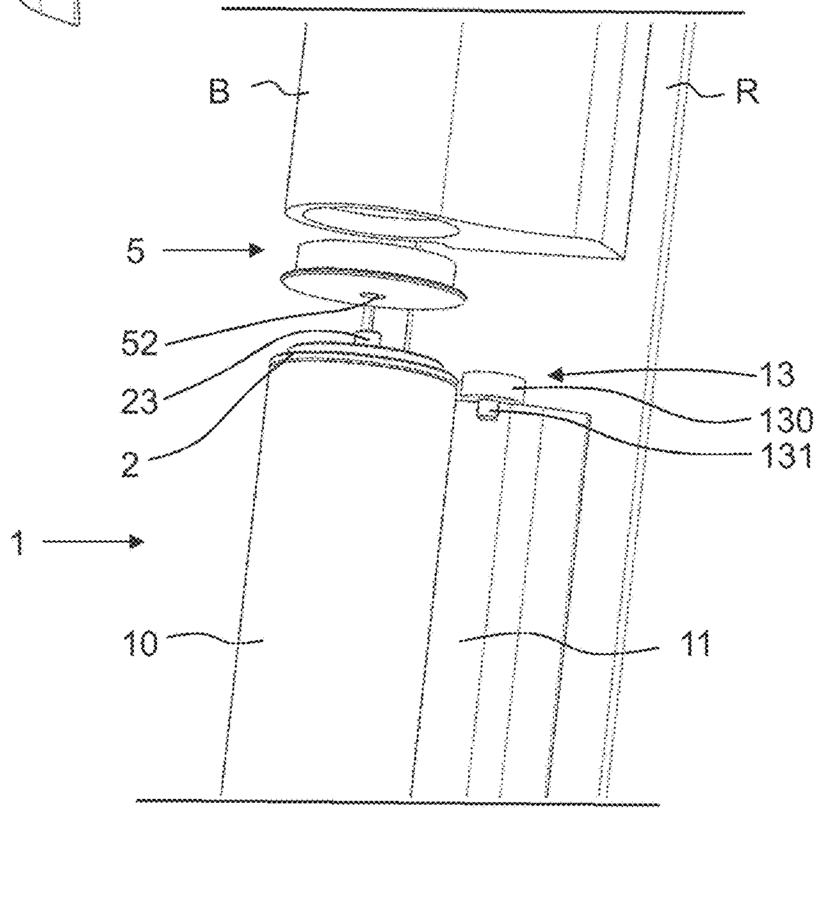
FIG. 24 shows an exploded view of an installation variant of the finger protection device with the protective profile according to FIG. 23.

FIGS. 23 and 24 show a further exemplary embodiment of the finger protection device according to the invention. The protective profile 1 is substantially designed as described above. It again has a protective wall 11 projecting from the tube 10. However, the protective wall 11 does not have a securing groove, but ends in a flat edge. The protective wall 11 can form a flat surface or can be curved. In this example, the free end is slightly angled towards the door frame R or door leaf F. The adapter part 2 has the same design as described above. As can be seen in FIG. 24, the cover 5 is provided with its receiving opening for receiving the pin 23 of the adapter part 2. The cover 5 is inserted into the opening of the hinge B. The upper end of the finger protection device is shown. The clamping element 3 in the form of a clip 30 with a limb 31, which corresponds in shape to the protective wall 11, is present at the lower end of the protective profile 1, which is not shown here. The clamping element 3 is shown and described in FIGS. 31 and 32.

To fix the protective wall 11 to the door frame R or to the door leaf, a locking device 13, here in the form of a cam, is provided instead of the securing groove. The locking device 13 has a base body 130 and a clamping part 131 arranged thereon, for example a resilient clip. The base body 130 has a flat surface, which is preferably adhesive. The thickness of the base body 130 corresponds to the distance between the upper edge of the protective wall 11 and the door hinge B in the mounted state. The base body 130 preferably has the shape of a round disk. The clamping part 131 fixes the locking device 13 releasably on the upper edge of the protective wall 11. Similarly, the locking device 13 can be used on the lower edge of the protective wall 11 for the hinge B underneath.

Figure 25:
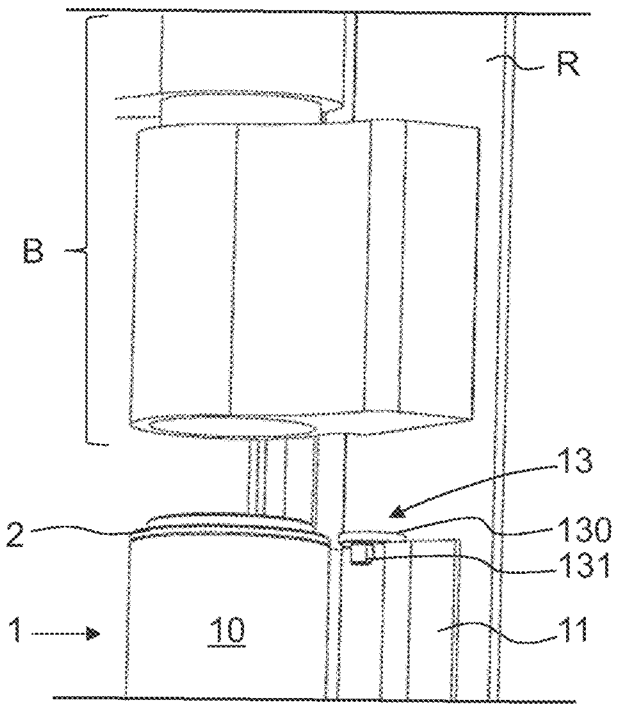
FIG. 25 shows a view of an installation variant of the finger protection device with a variant of the protective profile according to FIG. 23 in a first mounting step.
Figure 26:
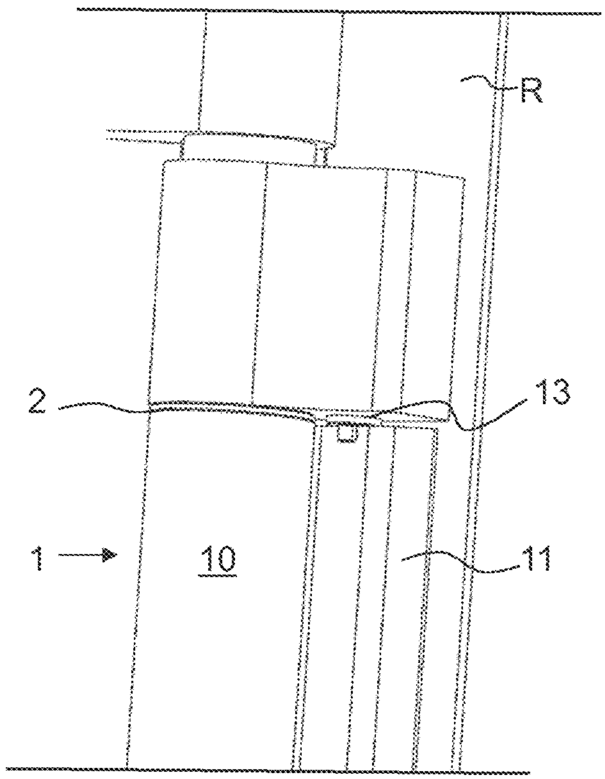
FIG. 26 shows the finger protection device according to FIG. 25 in the mounted state.

FIGS. 25 to 27 show the mounting and dismounting of a variant of this finger protection device. In contrast to the previous example, there is no cover 5. The adapter part 2 has an upper circumference that can be inserted into the opening of the hinge B, so that the adapter part 2 can be pivoted through the opening of the hinge B.

The base body of the locking device 13 is thinner than in the example above, as there is no cover 5.

In FIG. 25, the adapter part 2 is inserted into the tube 10 of the protective profile 1 and the locking device 13 is plugged onto the protective wall 11. In this combination, the finger protection device S is brought to the hinge B. The distance to the hinge is shown greater than is usually provided in practice. This combination is pressed against the hinge B and the locking device 13 is glued to the hinge B. This is shown in FIG. 26. The clamping element 3 can then be inserted at the lower end of the protective profile. This is not shown in these figures and is explained later in the text.

If the finger protection device S is to be removed, the protective profile 1 with the adapter part 2 can simply be pushed away from the hinge B after removing the clamping element 3. The locking device 13 remains on the hinge B. This can be seen in FIG. 27.

As described, these finger protection devices can be used between two hinges B. However, they can also be used at the upper and lower end of the door with a stop device 7. This is, for example, the stop device already described. Another embodiment of a stop device 7 that can also be used is shown in FIGS. 28 and 29.

It is designed similarly to the stop device shown in FIGS. 10 to 12. It also has a first limb 70 with at least one attachment hole 70 for attachment to the door frame R or to the door leaf F. The second limb 72 is also arranged at right angles to the first limb 70 and is provided with a slot 74. A displacement groove 78 is provided in the second limb 74 and extends along the slot 74. A sliding block 77 can be inserted into this sliding groove 78. The sliding block 77 has a threaded hole.

An adapter part 2' is used at this end, which is substantially the same as the adapter parts 2 already described. It has a base body 20' and a flange 21'. The base body 201 can be the same thickness as the adapter parts described above. However, it is usually narrower, as shown in FIG. 28. The adapter part 2' has struts 24' and a receiving opening 240'. However, the receiving opening 240' is arranged decentrally. Instead of a pin 23, a fixing element 76, in this case a screw, is screwed through the decentral receiving opening 240' and through the slot 74 into the sliding block 77. By rotating the adapter part 2' and moving it along the slot 74, the horizontal position of the adapter part 2' and the protective profile 1 can be selected to match the hinge B.

FIG. 29 shows the finger protection device in the mounted state. As explained in FIGS. 25 to 27, it has been fixed at the upper end with the locking device 13 to prevent the protective wall 11 from pivoting. The clamping element 3 shown in FIG. 31 was clicked into place in the lower region. The upward-facing upper lug 310 of the limb 31 was pushed between the protective wall 11 and the door and thus clamped. A lower lug 311, which is visible in FIG. 29, would be used in the same way if the clamping element 3 were used in the upper region of the finger protection device. Preferably, the lugs 310, 311 can be bent off and removed if they are not needed and disturb the visual appearance.

Figure 30:
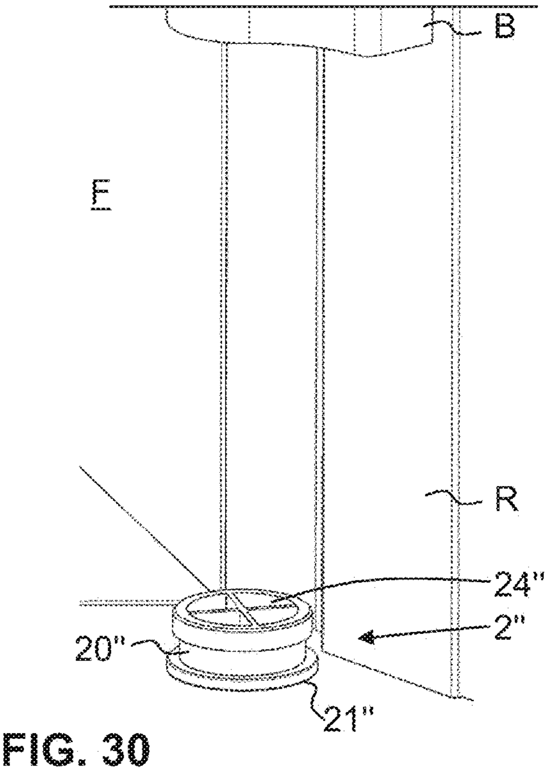
FIG. 30 shows a perspective view of a further installation variant of the finger protection device according to the invention with a further variant of an adapter part in a first mounting step.
Figure 31:
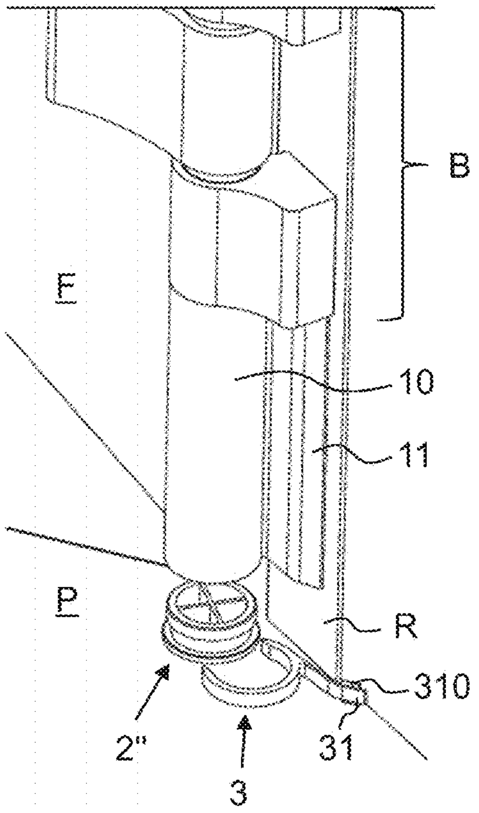
FIG. 31 shows the finger protection device according to FIG. 30 in a further mounting step.
Figure 32:
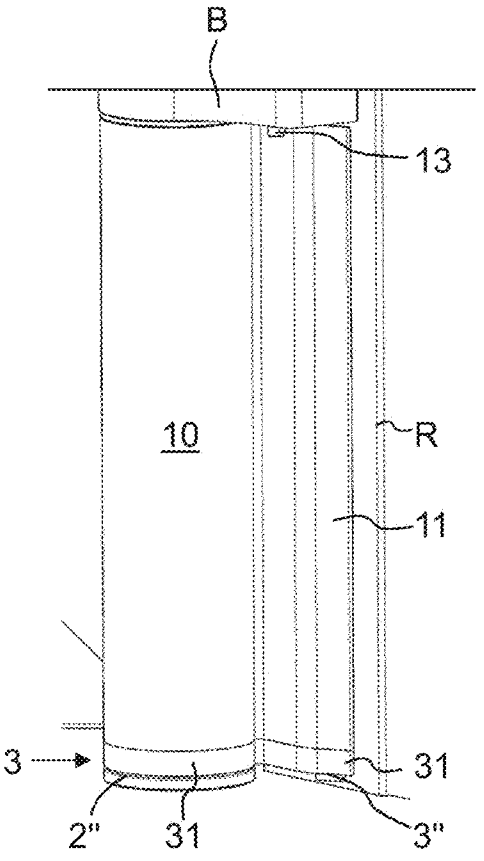
FIG. 32 shows the finger protection device according to FIG. 30 in the mounted state.

The protective device according to the invention can also be used in the upper and lower region of the door without stop device 7. An example of this is shown in FIGS. 30 to 32. For this purpose, the adapter part 2 is attached to the building floor P. It is preferably glued on. However, it can also be screwed on. The adapter part 2 can, for example, be designed in the same way as described in the previous embodiments. In the illustrated exemplary embodiment, its base body 20" is narrow as in FIG. 28. It has struts 24", but no receiving opening for a screw or a pin, as it is glued to the floor P with its flange 21".

As can be seen in FIG. 31, the protective profile 1 with the tube 10 and the protective wall 11 is pushed upwards as shown in FIGS. 25 and 26. The clamping element 3 is then clamped between the adapter part 2" glued to the floor P and the protective profile 1. The upper lug 310 is clamped behind the protective wall 11. The shape of the limb 31 corresponds to the shape of the protective wall 11 and is aligned with it, as can be clearly seen in FIG. 32.

Figure 33:
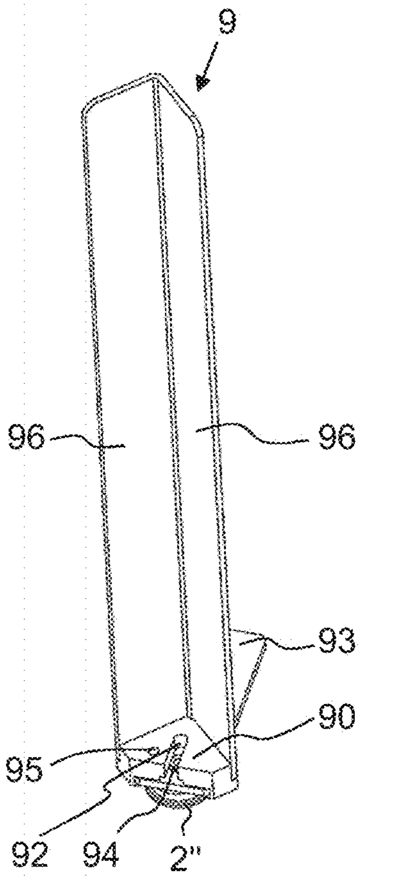
FIG. 33 shows a perspective view of a mounting jig in a second embodiment.
Figure 34:
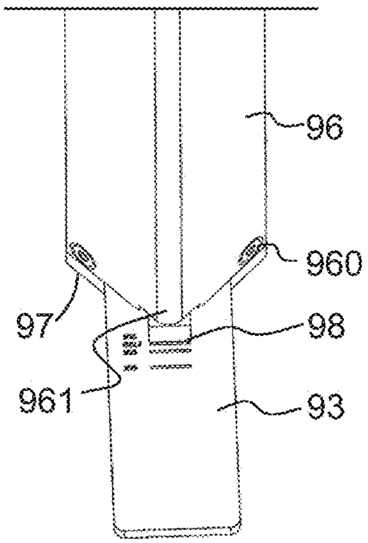
FIG. 34 shows a perspective view of a part of the mounting jig according to FIG. 33 from an opposite side.

A mounting jig 9 is provided so that the base-side adapter part 2" can be positioned easily. This is shown in FIGS. 33 and 34. The mounting jig 9 uses the principle of the first mounting jig 8 already described, which is used to form the hole in the cover 5.

This second mounting jig 9 has a base plate 90 with two edges, which preferably form a right angle. An angle profile, preferably made of aluminum or sheet metal, is arranged on the base plate 90 and forms two stop surfaces 96. The stop surfaces 96 preferably form a right angle. The angle profile is preferably detachably attached to the base plate 90 by means of screws 960.

The base plate 90 has a slot 92, which extends along a bisecting line between the two stop surfaces 96. On the side of the base plate 90 opposite the stop surfaces 96, a slider 93 is displaceably held in a groove 97 of the base plate 90. It can be moved along the slot 92. It has a marking 98, preferably in the form of a scale.

As in the embodiment shown in FIGS. 19 to 22, the slider 93 has a receiving opening 94. It can be seen in FIG. 33.

There is a fixing hole 95 in the base body 90. The slider 93 can be fixed in its position relative to the base plate 90 by means of a grub screw (not shown). This can be seen in FIG. 33.

FIGS. 35 to 39 show how this second mounting jig 9 can be used to position the adapter part 2". The adapter part 2" is of the same or similar design as the adapter parts already described. It has a pin 23", which can be seen in FIG. 39. An adhesive is preferably applied to the underside of the flange 21".

Figure 35:
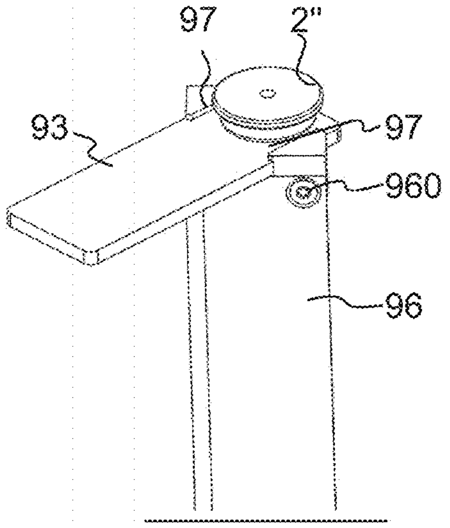
FIG. 35 shows a perspective view of the mounting jig according to FIG. 33 for positioning an adapter part from below.
Figure 36:
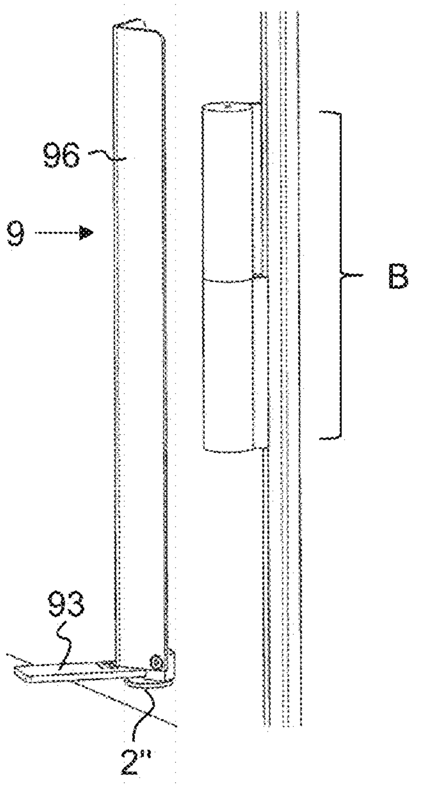
FIG. 36 shows a perspective view of the mounting jig according to FIG. 33 when positioning the adapter part in a first step.
Figure 37:
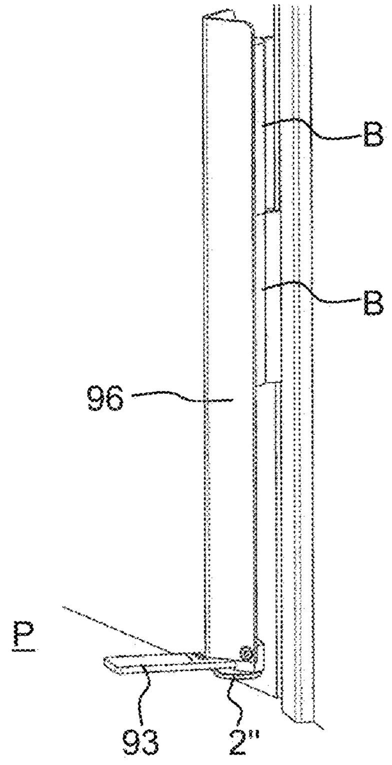
FIG. 37 shows the mounting jig according to FIG. 36 in a second step.
Figure 38:
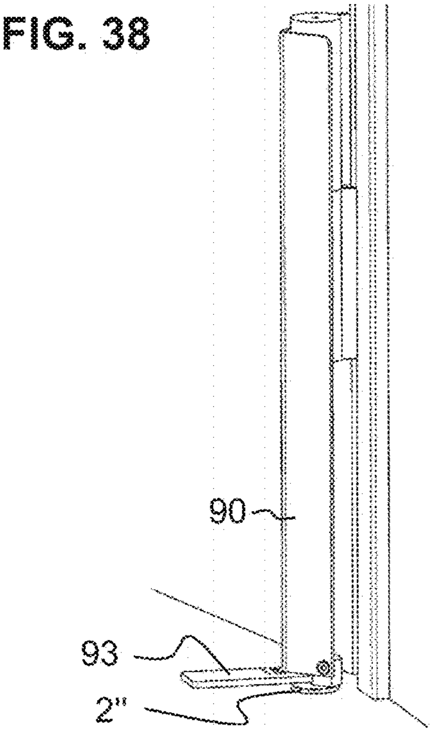
FIG. 38 shows the mounting jig according to FIG. 36 in a third step.
Figure 39:
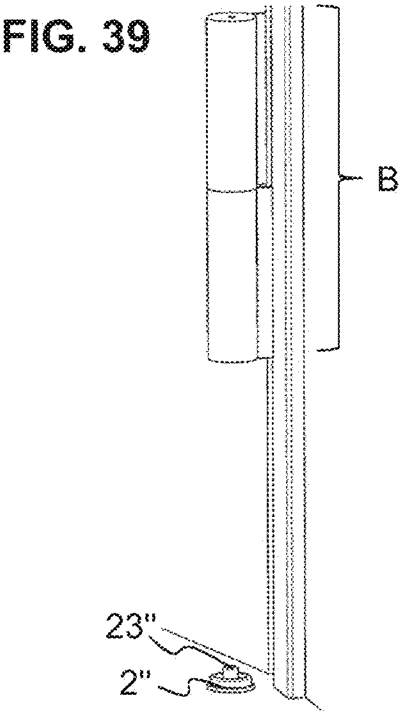
FIG. 39 shows the adapter part positioned in relation to the door hinge according to FIG. 36.

As can be seen in FIG. 35, the adapter part 21" is pressed into the receiving opening 94 of the slider 93 with the pin 23". Other types of mounting are also possible, for example clamping rings, clips, snap-on elements. The slider 93 is adjusted in advance or with the adapter part 2" attached according to the diameter of the hinge B. The marking 98 on the slider is used for this purpose, wherein the angle back, formed by the angle profile with the stop surfaces 96, serves as a reference 961 for the marking for adjusting the slider 93. This is clearly recognizable in FIG. 34. The position of the slider 93 in relation to the base plate 90 is preferably fixed as mentioned above.

The mounting jig 9 is then placed against the hinge B of the door together with the adapter part 2" held on it and is guided downwards until it rests on the base P. The stop surfaces 96 are in contact with the hinge. This is clearly visible in FIGS. 36 to 38.

As the position of the slider 93 corresponds to the hinge diameter, the adapter part 2" rests in the correct position on the base P. It can now be pressed down so that it is glued to the base P. The mounting jig 9 can be removed. This situation can be seen in FIG. 39. The protective profile 1 and the clamping element 3 can now be mounted as described above.

As an alternative or in addition to gluing, the adapter part 2" can also be screwed onto the base P.

The same mounting jig 9 can also be used to attach the receiving opening 52 in the cover 5. The slot 94, which is not necessary for positioning the adapter part 2", is used for this purpose.

The slider 93 is adjusted according to the diameter of the cover 5. The same marking 98 or a marking arranged parallel to it can be used for this purpose. This adjustment of the slider 93 is also preferably fixed, preferably by means of the mentioned grub screws in the fixing hole 95.

As can be seen in FIG. 40, the cover 95 is inserted between the stop surfaces 96 so that it rests against them and is placed on the base plate 90. In FIG. 40, there is already a hole in the cover 5, which shows the situation after the hole has been made using the mounting jig 9.

The receiving opening 94 in the slider 93 forms a passage with the slot 92 and thus a drilled hole to the cover 5.

Preferably, a drill bush 91 is inserted in the receiving opening 94, as can be seen in FIGS. 40 and 42. It facilitates guidance during drilling and protects the receiving opening 94, which also serves as a retaining means when positioning the adapter part 2".

A drilling aid 99 is provided on the side of the cover 5 opposite the slider 93. This drilling aid can be inserted into the angle profile if required. It has a flat base surface with a blind hole 991. Its base body forms a shaft 990 or another shape that is suitable for one-handed fixing of the part within the angle profile. The drilling aid 99 fixes the cover 5 in its position on the base plate 90 and thus enables the hole 52 in the cover 5 to be drilled by access through the drill bush 91 or through the receiving opening 94.

The drilling aid 99 preferably has an eyelet 992. The same applies to the drill bush 91. The eyelets are used to attach the two individual components to the rest of the mounting jig 9 for transportation and storage.

FIG. 43 shows the cover 5 with the base body 50, in which a hole or a receiving opening 52 has been drilled using the mounting jig 9.

When using the second mounting jig 9, it is not necessary to use the first mounting jig 8, but it can be used alternatively or additionally.

The hinge-side finger protection device according to the invention enables quick and easy installation on a door. Furthermore, it can be used with a variety of different door hinges. The mounting aids facilitate the mounting of the adapter part and/or cover.

The invention claimed is:

1. A hinge-side finger protection device for a leaf door, the hinge-side finger protection device comprising:

a protective profile for bridging a gap on the hinge side between a pivotable door leaf and a door frame of the leaf door, wherein the protective profile is attachable to the leaf door by clamping between two door hinges or between a door hinge and a stop device, an adapter part with an end face of which the position relative to the protective profile is changeable in the longitudinal direction in order to enable the protective profile to be inserted and clamped between the door hinges or between the one door hinge and the stop device, wherein the adapter part is insertable into the protective profile, wherein the end face of the adapter part, the position of which is changeable, is arranged on a side of the adapter part opposite the protective profile when the adapter part is inserted in the protective profile, wherein the finger protection device comprises a fixing unit to fix the position of the adapter part in the protective profile and/or a connection between the adapter part and the door hinge or the stop device or a floor or a ceiling, wherein the fixing unit has a clip, the clip fixing the adapter part in a position relative to the protective profile, wherein the adapter comprises a radially projecting flange, and wherein, for fixing, the clip is inserted between the flange of the adapter and an end face of the protective profile.

2. The hinge-side finger protection device as claimed in claim 1, wherein the adapter part is insertable into the protective profile in order to be inserted together with the protective profile between the door hinges or between the one door hinge and the stop device.

3. The hinge-side finger protection device as claimed in claim 1, wherein the protective profile comprises a tube, and wherein the adapter part is insertable into the tube.

4. The hinge-side finger protection device as claimed in claim 3, wherein the protective profile has a protective wall formed on the tube and projecting from the tube.

5. The hinge-side finger protection device as claimed in claim 4, wherein the protective wall forms a first securing element on a free longitudinal side, wherein the finger protection device has a securing profile which is attachable to the leaf door, and wherein the first securing element is connectable to the securing profile.

6. The hinge-side finger protection device as claimed in claim 5, further comprising a fixing unit to fix the position of the adapter part in the protective profile and/or a connection between the adapter part and the door hinge or the stop device or a floor or a ceiling and wherein the fixing unit comprises a second securing element which is connectable to the securing profile.

7. The hinge-side finger protection device as claimed in claim 4, wherein a securing means is provided which detachably fixes the protective wall to the leaf door.

8. The hinge-side finger protection device as claimed in claim 1, wherein the adapter part has a base body and an adjusting body, and wherein the adjusting body is connected resiliently to the base body and is variable in its position relative to the base body.

9. The hinge-side finger protection device as claimed in claim 1, wherein the adapter part comprises a coupling means for connection to the door hinge or to the stop device.

10. The hinge-side finger protection device as claimed in claim 9, wherein the coupling means is a pin projecting from the end face of the adapter part and/or a ring or ring portion projecting from the end face of the adapter part and/or a recess provided in the end face.

11. The hinge-side finger protection device as claimed in claim 1, wherein the adapter part has a stop means which rests on an end-face edge of the protective profile.

12. The hinge-side finger protection device as claimed in claim 11, wherein the stop means is a flange projecting radially from the adapter part.

13. The hinge-side finger protection device as claimed in claim 1, wherein the finger protection device further comprises a cover for mounting on or in the door hinge or the stop device, and wherein the adapter part is connectable to the cover.

14. The hinge-side finger protection device as claimed in claim 1, wherein the finger protection device comprises the stop device, and wherein the stop device has an attachment limb and an adjusting member, wherein the position of the adjusting member relative to the attachment limb is changeable transversely to the longitudinal direction of the protective profile.

15. The hinge-side finger protection device as claimed in claim 14, wherein the stop device is an angle element, wherein the attachment limb forms a first limb of the angle element and a second limb of the angle element is provided with a slot, and wherein the adapter part has a decentrally arranged through-opening for attaching the adapter part to the second limb in a selectable position along the slot.

16. A hinge-side finger protection device for a leaf door, the hinge-side finger protection device comprising:

a protective profile for bridging a gap on the hinge side between a pivotable door leaf and a door frame of the leaf door, wherein the protective profile is attachable to the leaf door by clamping between two door hinges or between a door hinge and a stop device, an adapter part with an end face of which the position relative to the protective profile is changeable in the longitudinal direction in order to enable the protective profile to be inserted and clamped between the door hinges or between the one door hinge and the stop device, wherein the adapter part is insertable into the protective profile, wherein the end face of the adapter part, the position of which is changeable, is arranged on a side of the adapter part opposite the protective profile when the adapter part is inserted in the protective profile, wherein the finger protection device comprises the stop device, wherein the stop device has an attachment limb and an adjusting member, and wherein the position of the adjusting member relative to the attachment limb is changeable transversely to the longitudinal direction of the protective profile.

17. The hinge-side finger protection device as claimed in claim 16, wherein the stop device is an angle element, wherein the attachment limb forms a first limb of the angle element and a second limb of the angle element is provided with a slot, and wherein the adapter part has a decentrally arranged through-opening for attaching the adapter part to the second limb in a selectable position along the slot.

* * * * *